United States Patent [19]

Kiencke et al.

[11] 4,198,882
[45] Apr. 22, 1980

[54] AUTOMATIC TRANSMISSION DIGITAL CONTROL SYSTEM

[75] Inventors: Uwe Kiencke, Ludwigsburg; Martin Zechnall, Schwieberdingen, both of Fed. Rep. of Germany

[73] Assignee: Robert Bosch GmbH, Stuttgart, Fed. Rep. of Germany

[21] Appl. No.: 862,441

[22] Filed: Dec. 20, 1977

[30] Foreign Application Priority Data

Dec. 23, 1976 [DE] Fed. Rep. of Germany ....... 2658464

[51] Int. Cl.² ............................................. B60K 41/18
[52] U.S. Cl. ...................................................... 74/866
[58] Field of Search .................. 74/866, 856, 869, 868, 74/859, 858, 860, 863; 123/32 EB, 32 EG, 32 EK, 117 D, 198 DC

[56] References Cited

U.S. PATENT DOCUMENTS

| 3,897,766 | 8/1975 | Pratt et al. | 123/117 D X |
| 3,938,409 | 2/1976 | Uozumi | 74/866 |
| 4,073,203 | 2/1978 | Wurst et al. | 74/869 X |
| 4,099,495 | 6/1978 | Kiencke et al. | 123/32 EB |

Primary Examiner—C. J. Husar
Assistant Examiner—Frank McKenzie
Attorney, Agent, or Firm—Frishauf, Holtz, Goodman & Woodward

[57] ABSTRACT

Transmission gear change characteristic curves, relating speed and loading, are stored in a memory. The digitally stored data are processed in a data processing unit connected to a synchronization and logic unit which controls a gear change control stage, actually controlling the gear shifting. The data processing unit compares output speed of the transmission with the characteristic curves stored in the memory relating speed and loading, and optimum transmission gear range, while additionally considering load signals derived from the engine to which the transmission is connected. Preferably, the entire unit is synchronized by output pulses derived from the output speed of the transmission, with prohibited states and gear changes being provided for to prevent shifting if the actual speed exceeds or recedes below critical levels.

11 Claims, 7 Drawing Figures

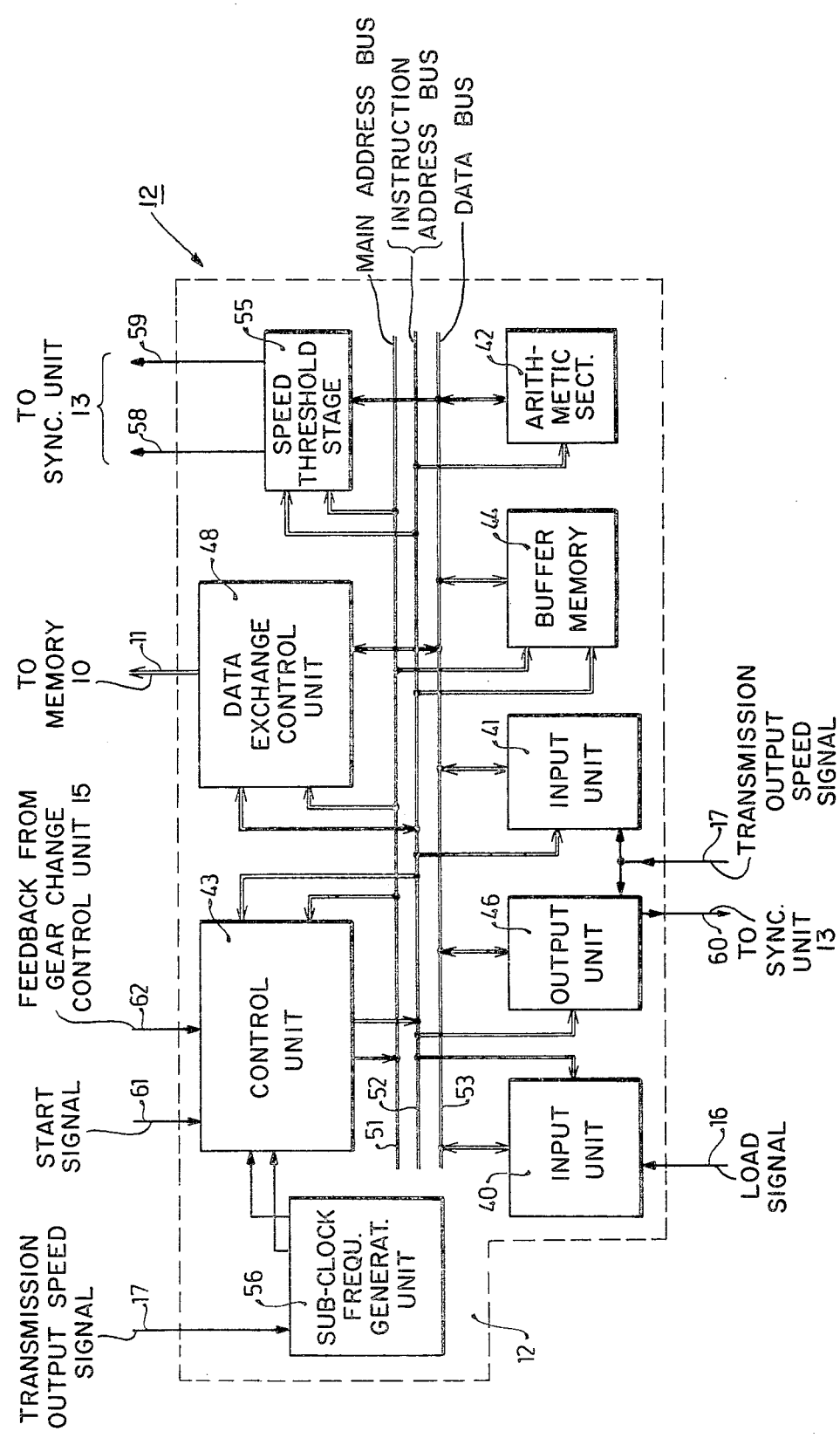

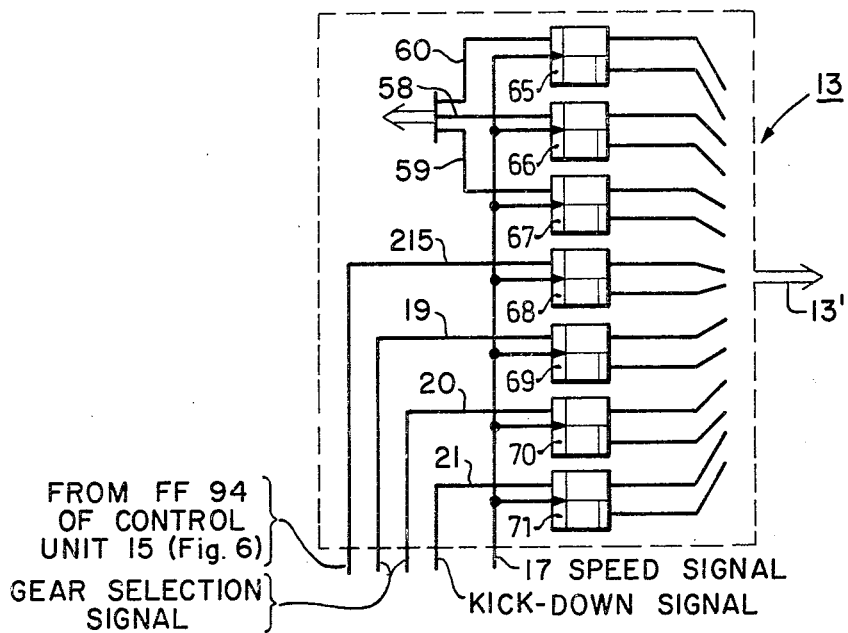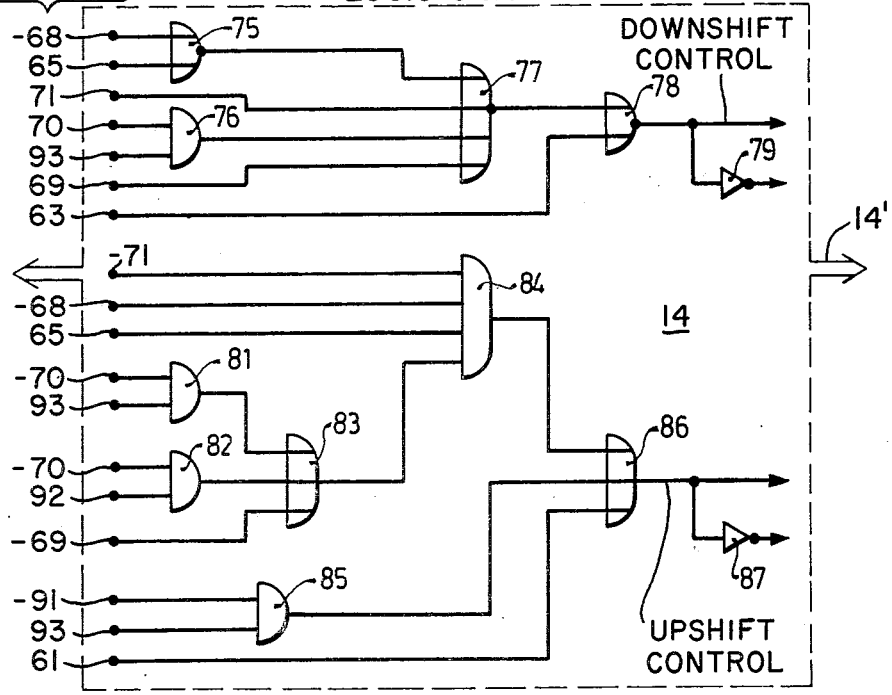

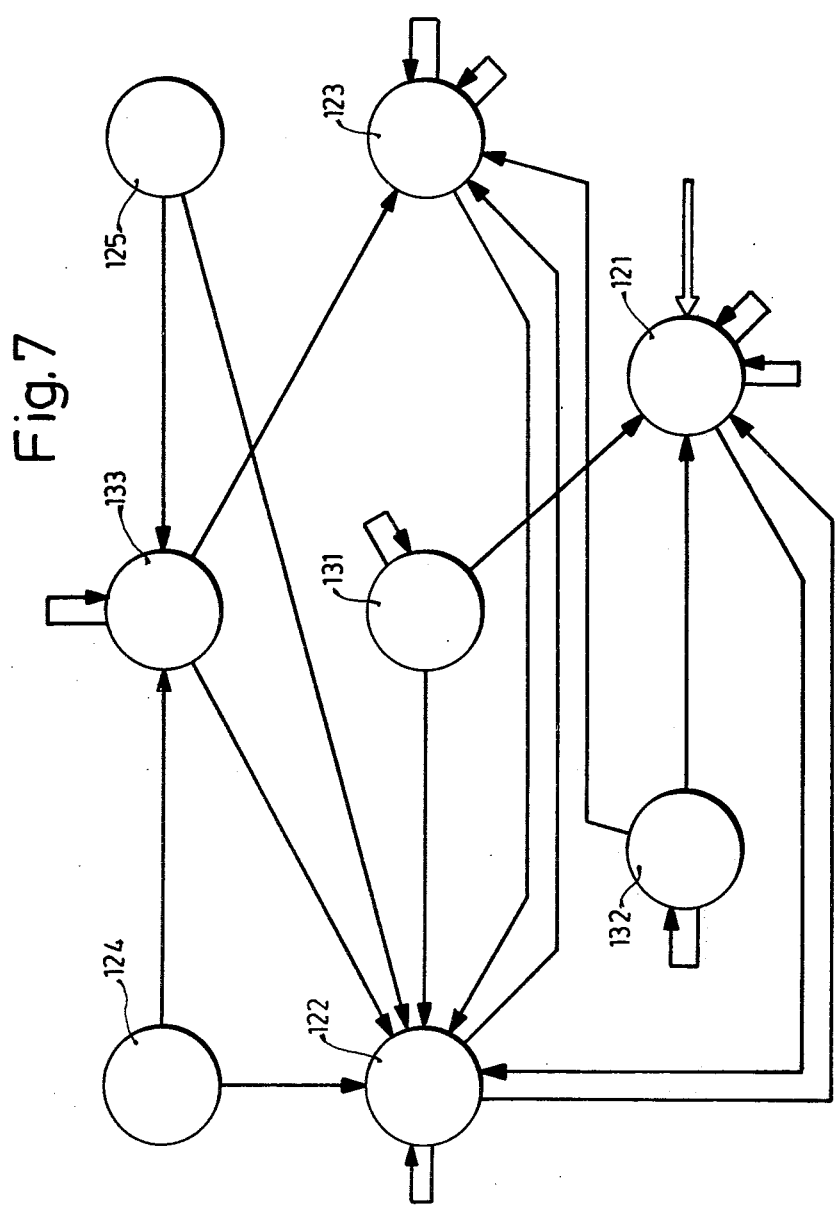

AUTOMATIC TRANSMISSION DIGITAL CONTROL SYSTEM

Cross reference to related application, assigned to the assignee of the present application.

U.S. Ser. No. 621,513, filed Oct. 10, 1975, WURST et al, now U.S. Pat. No. 4,073,203. U.S. Ser. No. 719,068, filed Aug. 30, 1976, Kiencke et al now U.S. Pat. No. 4,099,495.

The present invention relates to a system to control gear changing in transmissions, and more particularly to a digital control system for use in combination with automotive transmissions.

BACKGROUND AND PRIOR ART

It has previously been proposed—see German Disclosure Document DT-OS No. 24 36 701—to control the changing of gears in transmissions in dependence on the speed of a drive shaft. Various types of control systems for gear changing in transmissions have been proposed, particularly for use with automotive internal combustion engines to drive automotive vehicles. The gear selection is changed when the speed of the drive shaft rises above a predetermined threshold or drops below a predetermined threshold. Correction of the switch-over point can be obtained by additionally considering parameters other than speed, for example throttle position of the engine. Gear changing is effected, however, primarily by sensing speed, and can be effected only with reference to comparatively wide speed differences. Good matching of the engine to the load can thus be obtained only approximately. Matching of the electronic control system to different types of engines having different operating characteristics, and to different transmissions, is difficult and possible only with substantial changes of the electronic system.

THE PRESENT INVENTION

It is an object to improve control of an automatic transmission and, especially, to provide for better matching of gear changing to actual operating conditions of the entire drive train, or drive system, and preferably additionally permitting matching of the control system to specific engines and transmissions without essential difficulty.

Briefly, a memory is provided in which performance characteristics of the engine are stored, the performance characteristics relating speed and loading on the engine and storing the characteristics controlling gear changing. A digital logic circuit is connected to the memory, which compares actual sensed operating data with the characteristics stored in the memory and, upon sensing that a position is reached when gear changing should be initiated, triggers a controller to effect such gear changing.

The system permits storing in the memory the characteristics which permit optimum gear changing, so that the transmission will change gears actually under optimum conditions. The specific load-speed characteristics of the motor which are stored in the memory can be matched to the particular motor with which the system is used. Changing the memory, or re-programming the memory, permits changing the characteristics which are stored and on which the operating comparisons are based, so that the system can readily be matched to any desired engine.

The system can be instrumented as a micro-processor having a data processing system including a control unit, a logic unit, a data exchange unit, and buffer storage means. Protective and safety devices and systems can be provided which permit or ensure operation of the system even if portions of the electronic control systems have failed.

The data processing unit is constructed in the form of a micro-processor and may, essentially, be the same type of micro-processor which is used to compute ignition timing in computer-type solid state ignition control systems. This micro-processor is combined with an external memory which contains data relating operating parameters of the engine to gear via selection, rather than to ignition timing. The memory, thus, may have different characteristics stored therein, which can readily be matched to specific engines with specific vehicle bodies, thus readily associating the gear change characteristics for a specific vehicle with the control system. U.S. application Ser. No. 719,068, filed Aug. 30, 1976, now U.S. Pat. No. 4,099,495 and by the co-inventors hereof together with Messrs. Ulrich Flaig and Gunther Honig discloses and claims a system to determine the timing of a periodically repetitive event, typically the timing of ignition pulse in which in data processing systems, typically a micro-processor, provides output signals relating operating parameters of the engine to the timing of ignition pulses. A similar micro-processor can be used in the present application, and reference is hereby made to the aforementioned application for a discussion of the data processing unit thereof, and the disclosure of which is incorporated.

Drawings, illustrating an example:

FIG. 3 is a block diagram of a preferred embodiment of a data processing unit;

FIG. 4 is a schematic block diagram of a synchronization unit;

FIG. 5 is a schematic block diagram of a logic circuit to provide pulses for up-shifting, that is, shifting from a lower to a higher gear and for down-shifting, that is, shifting from a higher to a lower gear;

FIG. 7 is a schematic functional diagram of the operation of the shifting control unit, in representational, graphic form.

Figure 1:
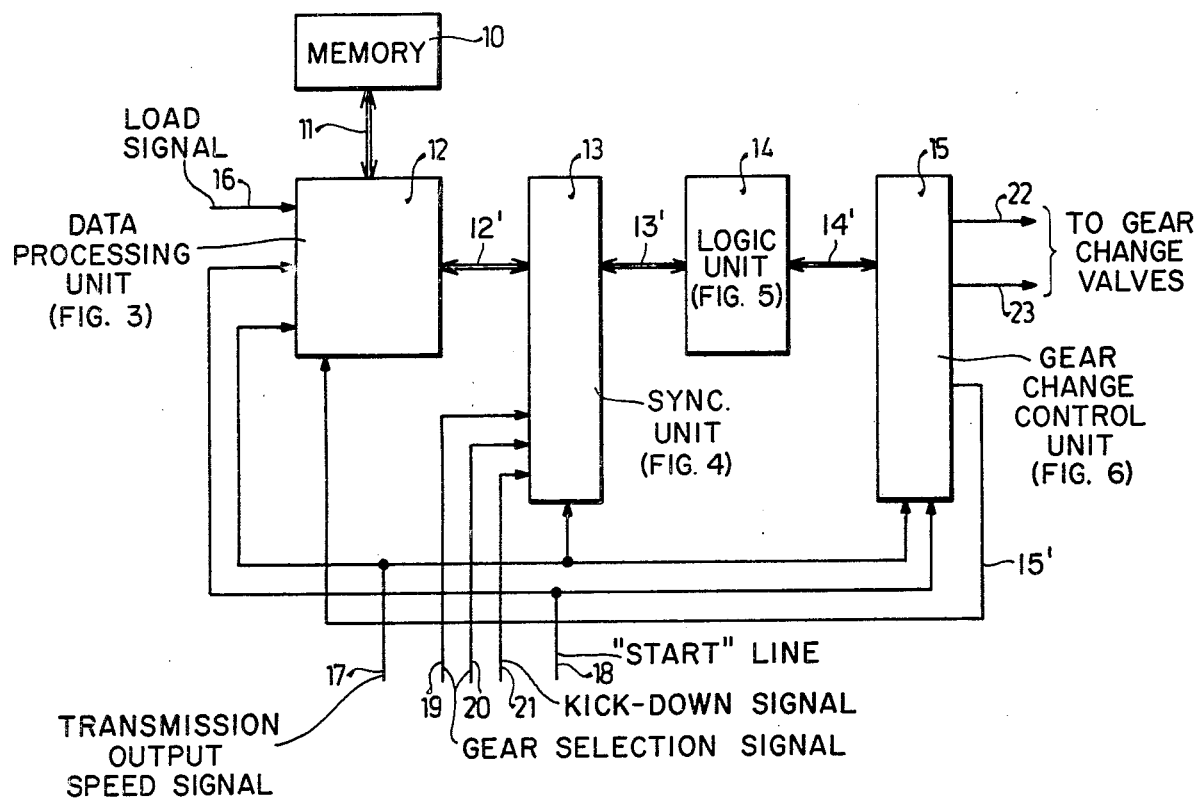
FIG. 1 is a highly schematic block diagram of a preferred embodiment of the invention for use in an automatic automotive vehicle gear changing system.

Referring to FIG. 1: A memory 10 is connected by data bus 11 to a data processing unit 12. A data bus connects the data processing unit 12 to a synchronization unit 13 which, in turn, is further connected by a data bus to a logic unit 14. The logic unit 14 is connected by a data bus to the gear change control unit 15. The unit 15 is a switching unit which controls, for example, operation of hydraulic valves which initiate gear changing.

The gear change control unit 15 is connected over a feedback line 15' to an input of the data processing unit 12. The data buses are indicated by double lines in FIG. 1. The data processing unit 12 has a further input 16 which carries a signal proportional to loading on the engine with which the system is to be used. A signal representative of transmission output speed is applied on line 17 to the data processing unit 12, the synchronization unit 13, and the gear change control unit 15. These signals are pulses which have a repetition rate proportional to the output speed of the transmission, that is, for example, the speed available at the output shaft of an automotive automatic transmission. Line 18 carries a start signal, that is, a signal or a pulse which resets the entire system upon starting of the engine, that is, to reset the system to a starting position when it is first enabled or connected. Lines 19, 20 are connected to a gear selection lever (not shown) to provide gear selection signals to the synchronization unit 13, that is, signals representative of manually selected transmission gears. A kickdown switch (not shown) provides a kickdown signal on line 21 to the synchronization unit 13. Kickdown signals are provided if there is a sudden or rapid change of the throttle of the engine to its wide-open position, for example when required for rapid acceleration which, for maximum torque and acceleration, should also effect downshifting of the transmission.

The data processing unit 12 compares the transmission output speed information derived from line 17 and the load information derived from line 16 with the load-speed characteristics stored in memory 10. The resulting information is connected over data bus 12' to the synchronization unit 13, and then through line 13' connected to the logic unit 14 for application over line 14' to the gear change control unit 15. The output speed signal 17 synchronizes the entire system and provides a local clock source for the respective units. The gear change control unit 15 is controlled by the data on line 14', as determined automatically by the data processing unit 12 and/or the operation commanded by gear selection signals on line 19, 20 and the kickdown signal on line 21, respectively. Control unit 15 provides control outputs at output lines 22, 23 to control, for example, operating valves of an automatic transmission.

When the system is first enabled, a pulse is derived from line 18 which sets the data processing unit 12 and the gear change control unit 15 into an initial or starting state. Clock pulses, at a reduced or slowed rate, are applied to the data processing unit 12 and to the gear change control unit 15.

The various stages will be described in detail below. The explanation will use customary binary logic notation, in which a signal level close to operating voltage will be referred to as a logic 1-signal, whereas a signal level at approximately zero or reference voltage will be referred to as a logic 0-signal.

Figure 2:
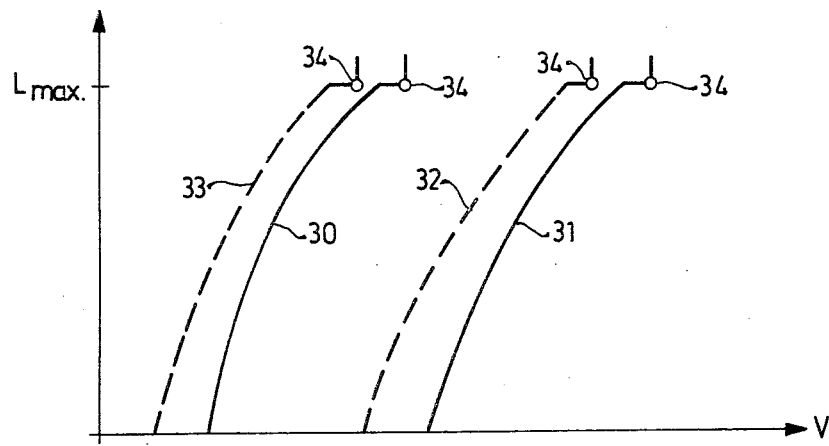
FIG. 2 is a series of graphs showing characteristics of a typical motor which are stored in the memory of the system.

The characteristic curves stored in memory 10 are shown in FIG. 2. The abscissa shows output speed, the ordinate load. The characteristic curve 30 illustrates the relationship between load and speed and changing gear from first to second speed range. Curve 31 shows those points of the coordinate in which change of gear from second to third speed range should be effected. Curves 32, 33 illustrate the relationships for downshifting, that is, from third to second, or from second to first speed range, respectively. In case of kickdown, change-over speed-dependent points 34 are shown. Different engines may have characteristics of different shape and slope. The system can readily be matched to any type of engine by changing the stored function in the memory 10, or by reading-in new values into the memory 10. Memory 10, preferably, is a read-only memory (ROM) or programmable ROM (PROM).

The data processing unit 12 is shown in greater detail in FIG. 3. It contains, essentially, four function blocks or elements:

input circuits 40, 41 in which input data are converted into binary numbers;

arithmetic unit, with an arithmetic section 42, control section 43 and buffer memory 44;

and output unit 46, in which output pulses are formed and to provide for data exchange, including a data exchange control section 48, which is connected to the external memory over data line 11.

The unit 12 has three bus systems: A main address bus 51; an instruction address bus 52; and data bus 53.

The main address bus 51 determines macroprocessing, for example processing of load and speed data. The instruction address bus 52 determines microprocessing of the respective data, such as re-storing in memory, or sequencing of operation. Data bus 52 carries the data which are shifted internally between the various memories and units and sections. The three bus systems 51, 52, 53 are respectively connected to the various functional units and sections.

A speed threshold unit 55 determines speed threshold levels. Unit 56 is provided to generate subclock frequencies. It is connected to the transmission output speed signal line 17.

The data processing unit 12 has various signals applied thereto, as already shown in FIG. 1. The signal proportional to load is applied over line 16 to the input unit 40. Transmission output speed signal 17 is connected to the second input unit 41 over line 17. Since the transmission output speed signals also function as synchronization signals, they are additionally supplied to the output stage 46 and to the subclock frequency generation unit 56 which generates the subclock frequencies. Control of data exchange is effected by section 48 which is connected to the data bus 11 and hence with memory 10 (FIG. 1). The speed threshold unit 55 provides a pulse when threshold values stored in memory 10 have been reached. The pulses are provided over lines 58, 59, respectively. Output circuit 46 is connected to a data line 60, which corresponds to bus 12' (FIG. 1) and hence to the synchronization unit 13. An input 61 to the control section is connected to the start line 18; input 63 of the control section 43 corresponds to feedback line 15', and accepts feedback signals from FF 94 (FIG. 6) of the gear change control unit 15.

Data processing systems have been discussed in the literature at great length. The specific detailed operation of the components of the system need not be described, and only those details which are necessary for a complete understanding of the invention will be discussed. With respect to data processing devices and systems of this kind, reference may be made to the literature: "Designing Microprocessors with Standard Logic Devices"; Part 1 and 2, Electronics, Jan. 23, 1975, pp. 90–107; Bell and Newell: "Computer Structures", McGraw Hill 1971; Davis: "Introduction to Electronic Computers", McGraw Hill 1971. The system of the present invention is based on the subject matter described in these references.

Operation: The output unit 46 provides a pulse over line 60 if the load and speed values have reached a level or a value which is stored in the memory. Outputs 58 and 59 from the speed threshold unit 55 will have pulses appear thereat when the pulse number derived from the output speed transducer exceeds or recedes below fixed values retained in memory. These signals are applied to the synchronization circuit 13, which is shown in detail in FIG. 4.

Synchronization unit 13, FIG. 4: A plurality of flipflops (FF's) 65–71 are provided, the number of FF's corresponding to the number of the signals to be processed. The clock input of the FF's is connected to the transmission output speed signal line 17. The output line 60 from output unit 46 (FIG. 3) is connected to the input of FF 65. Lines 58 and 59 derived from the speed threshold unit 55 (FIG. 3) are connected to the inputs of FF's 66, 67. The inverting output of FF 94 of the gear change control unit 15 (FIG. 1) has its output connected to the input of FF 68. The inputs to FF's 69, 70 are connected, respectively, to terminals of a gear selector (not shown) and provide the signals from lines 19, 20 (FIG. 1). The input of FF 71 is connected to line 21 on which the kickdown signal derived from the kickdown switch is available.

The purpose of unit 13 of FIG. 4 is to synchronize the various inputs available on lines 17, 19, 20, 21, 58, 59, 60 and on a switching line 215 from FF 94 of the control unit 15 with the pulses proportional to transmission output speed on the line 17. The inverting and direct outputs from the FF's are provided to the logic unit 14 via data bus 13'.

Figure 6:
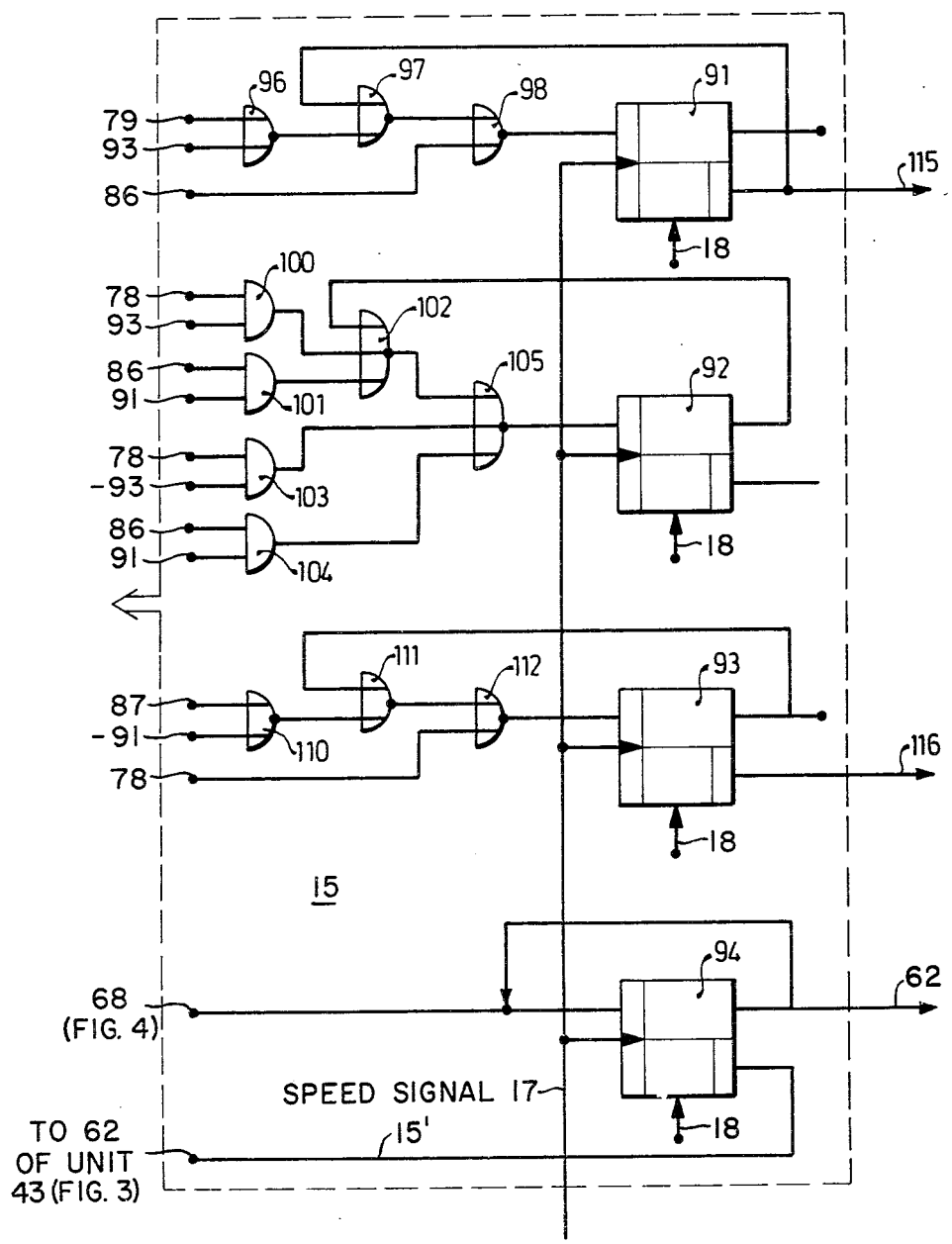
FIG. 6 is a schematic block diagram of the shift control unit which controls the actual gear shifting apparatus.

Logic unit 14, FIG. 5: A NOR-gate 75 is connected to the inverting output of FF 68 (FIG. 4), a further input thereto being connected to the direct output of FF 65. An AND-gate 76 is connected to the direct output of FF 70, a further input thereof being connected to the direct output of an FF 93 which is part of the gear change control unit 15 (FIG. 6). The outputs of NOR-gate 75, AND-gate 76 and two further inputs are applied to a NOR-gate 77. The NOR-gate 77 additionally has the direct output of FF 71 and an output of FF 69 applied. The various connections are indicated, schematically, in FIG. 5, the minus sign indicating connection to the inverting output of the respective unit. The output of the NOR-gate 77 is connected to the input of a NOR-gate 78, a further input to which is connected to the direct output of FF 67 (FIG. 4). The output of NOR-gate 78 is connected to a data line further connected to the gear change control unit 15; additionally, it is connected to an inverter 79 which also forms part of the data line. An input of AND-gate 81 is connected to the inverting output of FF 70, a further input to which is connected to the direct output of FF 93 (FIG. 6) of the gear change control unit 15. AND-gate 82 has one input connected to the inverting output of FF 70, and a further input to the direct output of FF 92 (FIG. 6) of the gear change control unit 15. The outputs of gates 81, 82 are connected to an input of an OR-gate 83, which has a further input connected to the inverting output of FF 69. The inverting outputs of FF's 71 and 68, as well as the direct output of FF 65 and the output of OR-gate 83 are all connected to the input of an AND-gate 84. The inverting output from FF 91 (FIG. 6) of the gear change control unit 15 and the direct output of FF 93 (FIG. 6) are both connected to the inputs of an AND-gate 85, the output of which is connected to an input of OR-gate 86. OR-gate 86 has a further input derived from the output of AND-gate 84 as well as the direct output of FF 66 applied thereto. The output of OR-gate 86, as well as an inverting output inverted in inverter 87, are connected to the data bus.

Operation: The logic unit 14 has the purpose to command operation of the gear change control unit 15 based on externally generated commands which can be controlled either by external commands or by the data processing unit (FIG. 3). The output of NOR-gate 78 (FIG. 5) provides a pulse if downshifting is to be carried out, that is, if shifting is to be from a higher to a lower speed range. The circuit as described provides such a pulse if the load characteristic, stored in the memory, for example the line 33 (FIG. 2) is passed in a downward direction due to the data applied to the data processing unit 12. The load characteristic line 33 is retrieved or is calculated in accordance with characteristics stored in memory. A pulse is also provided if, for example manually, a gear selection switch prohibits gear changing to a higher speed, and a higher speed had been engaged. A pulse is also provided if a predetermined speed threshold is passed in downward direction, that is, if the speed drops below the low-speed threshold.

The output of the OR-gate 86 will have a pulse appear thereat if switching should occur from a lower to a higher gear transmission range. This will occur—due to the external connections—if the load characteristic line, for example line 30, calculated by the data processing unit 12 based on the data stored in memory, is exceeded in an upward direction; in other words, when the values for speed and load pass through the specific characteristic curve, as calculated. A pulse is suppressed if, for example by manual setting, a maximum speed is set by the gear selector so that change-over into a higher gear is probited. The pulse is supplied, however, in any event if a predetermined speed threshold is exceeded.

Gear change control unit 15, FIG. 6: The gear change control unit, which may be referred to as a Mealy automatic unit, is illustrated in the present example for a three-speed transmission.

A NOR-gate 96 has two inputs, one connected to the output of inverter 79 and the other to the direct output of FF 93. The outputs of NOR-gate 96 and the inverting output of FF 91 are connected to a second NOR-gate 97. The output of NOR-gate 97 and the output of AND-gate 86 are connected to an input of OR-gate 98, the output of which is connected to the input of FF 91. The inverting output of FF 91 is connected to a valve controlling the automatic transmission (not shown) over line 115.

An AND-gate 100 has the output of NOR-gate 78 (FIG. 5) and the direct output of FF 93 applied thereto. AND-gate 101 has the direct output of FF 91 and the output of OR-gate 86 applied. AND-gate 103 has the output of NOR-gate 78 and the inverting output of FF 93 applied. AND-gate 104 has the direct output of FF 91 and the output of OR-gate 86 applied. NOR-gate 92 has the outputs of NOR-gates 100 and 101 as well as the direct output of FF 92 applied thereto. NOR-gate 105 has the outputs of NOR-gate 102 and AND-gates 103, 104 applied. The output of NOR-gate 105 is connected to the input of FF 92.

The output of inverter 87 (FIG. 5) of the logic unit 14 is connected to the input of a NOR-gate 110, the output of which is connected to one input of NOR-gate 111, the other input of which is connected to the direct output of FF 93. The outputs of NOR-gate 111 and of NOR-gate 78 (FIG. 5) are connected to an input of NOR-gate 112, the output of which is connected to the input of FF 93. The inverting output of FF 93 is connected via line 116 to a second valve of the automatic transmission. The input to FF 94 is connected to the inverting output thereof and to the input of FF 68 of the synchronization unit 13, FIG. 4. The direct output of FF 94 is connected to the input line 62 of the data processing unit 12, and corresponds to line 15' (FIG. 1). The clock inputs to FF's 91, 92, 93, 94 are connected to the transmission output speed signal line 17. The "start" and reset line 18 is likewise connected to all the FF's.

Operation of control unit 15, with reference to the diagram of FIG. 7: FF 94 changes state in dependence on speed and so controls the data processing unit 12 that the data processing unit calculates the characteristics to switch from a lower to a higher speed range and then the characteristics to change from a higher to a lower range.

Upon starting of the device, the gear change control unit 15 is placed in the state 121 due to the presence of the "start" reset pulse on line 18. Beginning from this rest or initial state, the following changes can be controlled:

(1) If, at the next clock pulse, no pulse is derived from the logic stage or unit 14 (FIG. 5) or if a pulse is derived from inverter 79, the unit will remain in the base state 121. If a pulse is derived from up-shift OR-gate 86, the gear change control unit or stage 15 will switch over into state 122. If, subsequently, the logic stage 14 (FIG. 5) does not provide a pulse, stage 15 remains in state 122. If up-shift control OR-gate 86 provides a pulse, the gear change control unit 15 changes into state 123. If, however, with the unit in state 122, down-shift control NOR-gate 78 (FIG. 5) provides a pulse, the gear change control unit 15 reverts back to the initial state 121.

(2) Let it be assumed that the gear change control unit has shifted up to the third gear, that is, is in state 123. The unit will remain in state 123 if the logic unit 14 (FIG. 5) either does not provide a pulse or further pulses from the up-shift control unit 86. If, however, down-shift control NOR-gate 78 provides a pulse, the control unit 15 will switch back down to state 122.

The gear change control unit is so constructed that other states are also possible. States 124 and 125 are prohibited conditions, state 131 is redundant with respect to state 121, state 132 is redundant with respect to state 122, and state 133 is redundant with respect to state 123. The gear change control unit could reach the redundant or the prohibited states only if interference or noise pulses should somehow or other reach the control unit. If this should occur, the control unit is so arranged that it will revert to its normal state. For example, if the control unit is in state 124, a pulse of the OR-gate will change it to state 133 (redundant with respect to state 123); a pulse from NOR-gate 78 as well as from OR-gate 86 will change the stage 15 to state 122. State 125 will change upon presence of a pulse on gate 86 into state 133 (redundant with respect to 123); presence of a pulse from gate 86 as well as of a pulse on NOR-gate 78 causes change of state to state 122. The stage 15 reaches state 123 from state 133 upon presence of a pulse on the OR-gate 86. Upon presence of a pulse from NOR-gate 78, it reverts to state 122. If no pulse is derived from the logic unit 14, the automatic unit 15 will remain in state 133.

If, for example, due to interference pulses, unit 15 reaches state 132 (redundant with respect to 122), then it will change to state 123 if a pulse is derived from OR-gate 86 or into state 121 if a pulse is derived from NOR-gate 78. If no pulse is derived from logic unit 14, the automatic unit 15 will remain in state 132.

If the automatic unit has reached state 131 (redundant with respect to state 121), then it will remain in this state so long as no pulse is derived from the logic stage 14 (FIG. 5). If it receives a pulse from OR-gate 86 from logic unit 14, the automatic unit 15 will switch to state 122. Upon receipt of a pulse from NOR-gate 78, it will switch to state 121.

The logic conditions of the direct outputs of FF's 91, 92, 93 as well as suitable application of the states with the respective gear ranges of a three-speed transmission, are shown in FIG. 7 to graphically illustrate the operation of the gear change control unit 15, if the unit 15 has the circuit as illustrated in FIG. 6.

Automatic transmission control systems preferably are so arranged that continued operation of the motor vehicle with which the transmission is associated is possible even if the unit should fail in part. It is therefore desirable to introduce the calculated speed threshold pulses once more into the circuit—as late as possible—in order to ensure that, independent of the operation of the remaining units, change into a higher or lower speed will occur in any event in dependence on speed. Additionally, it is desirable to so arrange the logic circuit that it is not possible to switch from a higher gear range into a lower one if a certain speed is exceeded. Likewise, change of gear from a lower to a higher one should be prevented if a certain predetermined speed has not been reached, that is, if a certain predetermined speed has been passed in downward direction. Therefore the lines 63 from the direct output of FF 67 to gate 78 and the line 64 from the direct output of FF 66 to gate 86 are provided that a pulse is given to the control unit 15 in any case to gate 78, if the speed is below a certain value (for instance above point 34 (FIG. 2) or below point 35). A pulse from gate 78 will set the control unit 15 in a lower state (123 to 122; 122 to 121 for instance), a pulse from gate 86 in a higher state (121 to 122; 122 to 123 for instance).

The micro-processor 12 can be the same processing unit described in the aforementioned application U.S. Ser. No. 719,068 filed Aug. 30, 1976, Kiencke et now U.S. Pat. No. 4,099,495 as described in connection with FIG. 4 of that application. It is used together with the external memory 10 in which respective characteristics are stored which can match the gear change control system to any vehicle having any selected up-shift characteristic, or down-shift characteristic. The synchronization unit 13, the logic unit 14 and the gear change control unit 15 can be constructed in various ways, as desired and appropriate from an engineering stand point. The networks illustrated and specifically described are preferred networks illustrating one of many possibilities. The gear change control unit 15 includes redundancy. Since it has three flip flops, it can theoretically have eight states. Only three states are needed for three gears, however. The graphic representation of FIG. 7 therefore illustrates three redundant states and two prohibited states. The sequence of operation as illustrated with respect to FIG. 7 can be changed. Thus, the networks 14 and 15 can be differently constructed, and represent only one, albeit preferred example of various possibilities.

Flip flop 94, connected to flip flop 68 (FIGS. 4, 6) are used to alternately connect computation by the microprocessor 12 of the characteristics relating to upshifting from a lower to a higher gear, and for downshifting from a higher to a lower gear, as explained.

Various changes and modifications can be made within the scope of the inventive concept.

The micro-processor forming the data processing unit 12 of the present application can be the unit identical with the microprocessor 20 of FIG. 4 of the aforementioned application, and operated on a time sharing basis, selectively connectable to respective memories storing, respectively, ignition timing information or gear change timing information and respective output units controlling, respectively, ignition timing or gear change operations.

We claim:

1. Digital control system for an automatic transmission, particularly for automotive use, adapted for connection to a driving engine, comprising
   a load signal line (16) carrying a signal representative of loading placed on the engine;
   a speed signal line (17) carrying a signal representative of a shaft speed in the transmission;
   a memory (10) storing gear change characteristic functions relating output speed of the transmission and loading on the engine to suitable gear selection in the transmission;
   a digital data processing means (12, 13, 14) having said signals applied thereto and connected to said memory (10), said processing means comparing operating parameters of the transmission at the then engaged gear as represented by said speed signal and said load signal on the respective speed signal and load signal lines with the ideal operating parameters as represented by said gear change characteristic function stored in the memory, and providing computed gear change output signals if said comparison indicates that the actual operating parameters and the operating characteristics as represented by said characteristic function, at the engaged gear, differ;
   and a gear change control unit (15) controlled by said data processing means (12) and providing control signals (115, 116) to the gear change mechanism under command of said gear change output signals.

2. System according to claim 1, wherein said data processing means (12, 13, 14) includes a threshold circuit (55) controlling generation of said gear change output signal when the comparison indicates that predetermined speed parameters are exceeded.

3. System according to claim 1, wherein the data processing means (12, 13, 14) includes a data processing unit (12) comprising (FIG. 1) a control section (43), an arithmetic section (42), a data exchange control section (48) and a buffer memory (44), said sections being interconnected and said data processing stage (12) being connected to said memory (10), to said speed signal line (17) and said load signal line (16) and effecting the comparison of the prevailing operating conditions, as represented by signals on said respective signal lines (16, 17) of the transmission with the speed-load characteristics stored in the memory (10).

4. System according to claim 1, wherein the memory (10) has sufficient storage capacity to store two functions of speed-load characteristic curves for each speed range, one function curve (30, 31) storing the characteristics relating to up-shifting from a lower to a higher range, and the other function curves (32, 33) storing characteristics relating to down-shifting from a higher to a lower output speed range.

5. System according to claim 1, wherein the data processing means (12, 13, 14) includes (FIG. 4) a synchronization unit (13) and a logic unit, the synchronization unit (13) and the logic unit (14) being connected to said speed signal line (17) and operating at a clock frequency determined by the signals on said speed signal line (17).

6. System according to claim 1, further comprising a speed threshold circuit (55) connected to the speed signal line (17) and sensing output speed of the transmission, the speed threshold circuit providing an output signal when the speed exceeds above, or recedes below a predetermined speed, said threshold circuit providing a respective speed-dependent switching output signal (58, 59), the respective speed-dependent switching output signals being connected to said control unit (15) to command gear change in accordance with the respective speed-dependent switching output signal independently of computed speedload gear change command signals.

7. System according to claim 1, further comprising a protective circuit arrangement (58; 66) including a speed threshold circuit (55) connected to the speed signal line (17) and sensing a speed occurring in the transmission, and providing an output signal when the output speed of the transmission drops below a predetermined low speed, said signal being connected to the gear change control unit (15) and inhibiting up-shifting into a higher gear range when the speed has dropped below said predetermined low speed.

8. System according to claim 1, further comprising a protective circuit arrangement (59, 67) including a speed threshold circuit (55) connected to the speed signal line (17), sensing the speed in the transmission and providing an output signal when the output speed of the transmission exceeds a predetermined high speed, said signal being connected to the gear change control unit (15) and inhibiting down-shifting when said predetermined high speed is exceeded.

9. System according to claim 1, wherein said speed signal line (17) carries speed signal pulses representative of the output speed of the transmission.

10. System according to claim 1, wherein the memory has sufficient storage capacity to store two speed-load curve functions for each speed range, one function curve (30, 31) storing the characteristics relating to up-shifting to a higher speed range and the other function curve (32, 33) storing the characteristics relating to down-shifting to a lower speed range;
   a change-over switch (FIG. 6: 94) connected to and controlled by the speed signal line (17) and controlling alternately connection of either of the respective stored function curves in the memory to the data processing means (12, 13, 14).

11. System according to claim 1, wherein the data processing means (12, 13, 14) includes a logic unit (14) logically allocating up-shifting and down-shifting signals to said control unit (15);
   said system further including speed protective means (63,64) ensuring continued operability of the system even if malfunction in the logic unit (14) should occur.

* * * * *